Aug. 29, 1967   P. GOLDSTEIN ET AL   3,338,218
ONCE-THROUGH BOILER DOWNCOMER FLOW DISTRIBUTION SYSTEM
Filed Oct. 22, 1965
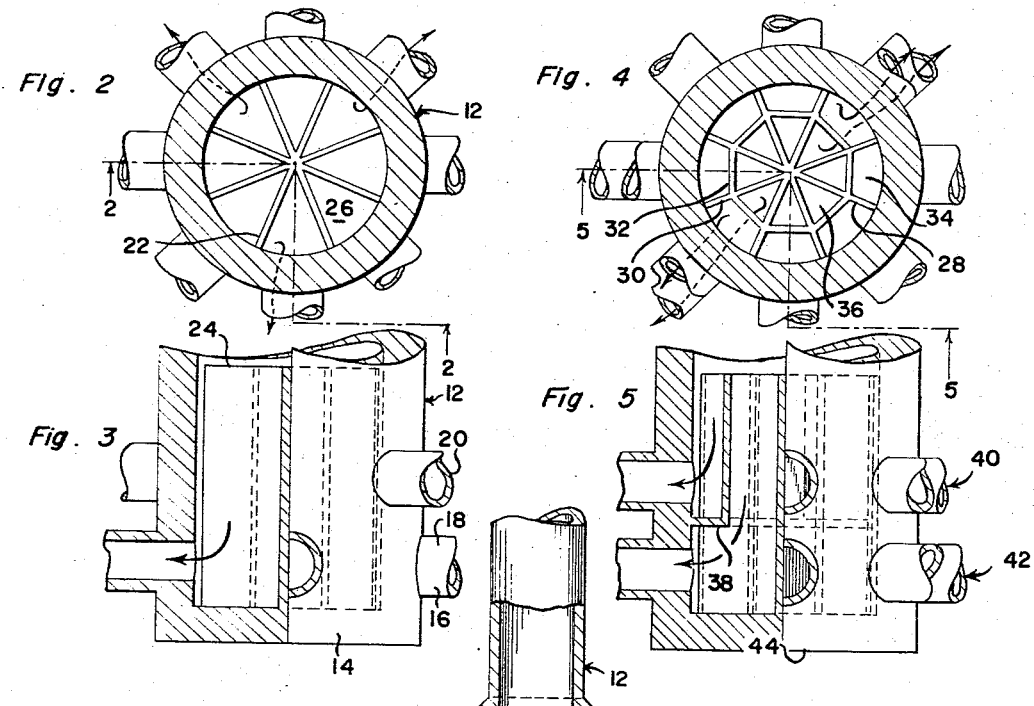
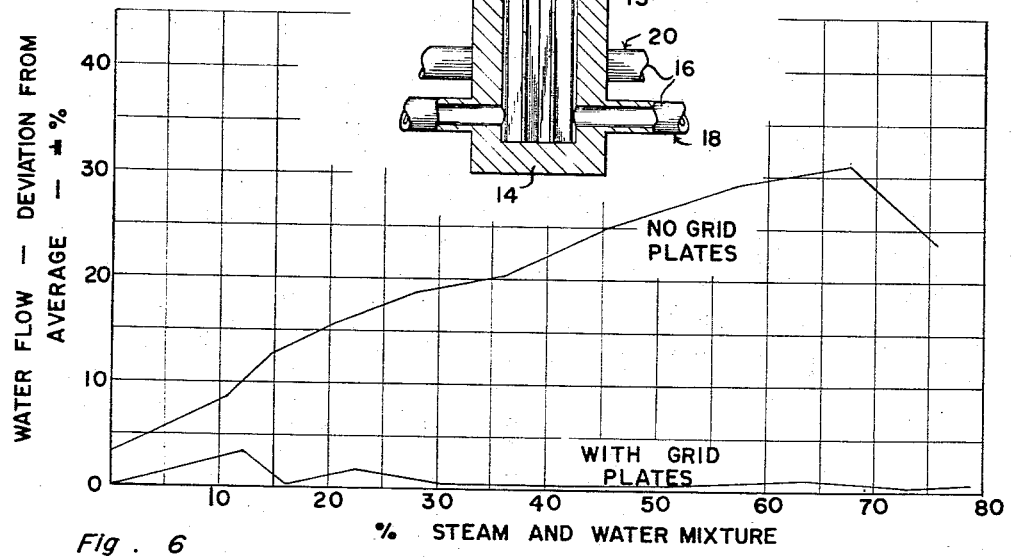
INVENTOR.
PAUL GOLDSTEIN
ROBERT J. ZOSCHAK
BY
Richard H. Thomas
ATTORNEY – # United States Patent Office 3,338,218
Patented Aug. 29, 1967

3,338,218
ONCE-THROUGH BOILER DOWNCOMER FLOW DISTRIBUTION SYSTEM
Paul Goldstein, Cresskill, and Robert J. Zoschak, Rutherford, N.J., assignors to Foster Wheeler Corporation, New York, N.Y., a corporation of New York
Filed Oct. 22, 1965, Ser. No. 501,598
5 Claims. (Cl. 122—406)

This invention relates to a once-through boiler downcomer system and in particular to downcomer means for improved distribution of a two-phase fluid in flow circuits of a once-through subcritical boiler.

In application Ser. No. 501,269, filed Oct. 22, 1965 by Walter P. Gorzegno and Jacob Cooper, a subcritical vapor boiler or generating unit is described having a plurality of adjacent or side-by-side upflow passes in the furnace wall, wherein the passes are connected in series by downcomers between the passes. The tube of the passes are all welded together to define a gas tight furnace enclosure. In the terminal or near terminal passes, sufficient heat has been absorbed by the fluid being heated such that the connections leading to these passes feed a steam and water mixture, perhaps 45% steam or higher, to the passes.

Generally, the terminal pass, located in the upper furnace, occupies a substantial proportion of the wall of the furnace such that a plurality of feeder tubes are required between the downcomer and the pass header. For instance, the feeder tubes may number as many as 16, presenting the problem of connecting these feeder tubes to the downcomer in a way such that the feeder tubes receive equal distributions of the steam and water mixture from the downcomer. A non-uniform distribution of steam and water to the feeder tubes will result in non-uniform distribution to the pass tubes and severe stresses in the all-welded pass tube panel.

It has been proposed to connect a spherical bottle to the end of the downcomer and to connect feeder tubes radially to the wall of the bottle, the bottle being sized to accommodate as many feeder tubes as are necessary. It was found that with such a device, the larger volume of the bottle relative the downcomer allowed phase separation of the steam and water with an unequal distribution of the phases in the feeder tubes.

With the feeder tubes simply connected directly to the downcomer, the large number requires at least two rows spaced from the end of the downcomer. A phase separation occurs with the upper row of feeder tubes receiving a higher proportion of steam and the lower row of feeder tubes receiving a higher proportion of water. It is apparent that the tubes in the furnace wall for the pass fed by the feeder tubes will also receive unequal proportions of steam and water.

This disadvantage is overcome in accordance with the present invention by providing in a downcomer, closed at the end thereof, and having attached thereto a plurality of feeder tubes radial to the downcomer in the vicinity of the closed end, but in a plurality of planes removed from the closed end, a plurality of plates lengthwise in the downcomer tube defining a plurality of compartments designed to divide the flow. The plates are arranged so that a compartment is provided for each feeder tube, the plates extending upstream of the downcomer closed end a distance more removed from the end than the furthermost removed row of feeder tubes.

It will become apparent that the invention provides a means for distribution of a downcomer flow by which uniform ratios of steam and water to the feeder tubes are obtained. In addition, it will be apparent that the invention provides a means for distribution of the flow in which no additional flow distributor is required other than the downcomer end, and in which a large number of feeder tubes can be served by a single downcomer tube.

Other advantages and the invention will be apparent from consideration of the following specification and accompanying drawings, in which
FIGURE 1 is a section view illustrating the invention;
FIGURE 2 is an enlarged section view of the downcomer of FIG. 1;
FIGURE 3 is a section view taken along line 3—3 of FIG. 2;
FIGURE 4 is a section view of an embodiment of the invention;
FIGURE 5 is a section view taken along line 5—5 of FIG. 4; and
FIGURE 6 is a graph showing improved results achieved in accordance with the invention.

Referring to FIGS. 1–3, the distribution system comprises the downcomer tube 12, having an enlarged portion 13 in the vicinity of its closed end 14, to accommodate feeder tubes 16. The feeder tubes are disposed radially in the wall of the downcomer in two rows 18 and 20 removed from the downcomer closed end 14. It is apparent that without taking remedial steps, a steam and water mixture flow in the downcomer tube 12 would separate at the bottom of the downcomer tube with a higher proportion of steam flowing into the upper row of tubes 20 than in the lower row of tubes 18 closer to the downcomer end.

To overcome this, the downcomer is divided internally by a grid of flat plates 22 installed in a radial array intersecting axially in the downcomer tube. The plates extend longitudinally in the tube from the downcomer end 14 to a point 24 well above the upper row of tubes 20 furthermost removed from the downcomer end. In sealing relation with the tube bottom and inside wall, the plates divide the tube in the vicinity of the end 14 into a number of segmental areas 26 equal in number to the total number of feeder tubes in the rows 18 and 20.

In the embodiment of FIGS. 1 and 2, the feeder tubes in the rows 18 and 20 are offset so that adjacent segmental areas will feed tubes of different rows.

In the application Ser. No. 501,269, mentioned above, the size of the furnace pass fed by this downcomer requires sixteen feeder tubes. Using the embodiment of FIGS. 1–3, the downcomer serves eight feeder tubes only, as a larger number of tubes (in two rows) would require increasing the wall thickness of the downcomer end 13 an exorbitant amount. Accordingly in the arrangement of the application Ser. No. 501,269, two downcomers are provided each supplying eight feeder tubes.

The arrangement of FIGS. 4 and 5 show how a larger number of tubes can be accommodated in the vicinity of the downcomer end. In this embodiment, the plates 28 describe both a radial array 30 and a cordal array 32 to obtain an outer or peripheral series of compartments 34 and an inner series of compartments 36. The outer series of compartments are provided with a closed bottom 38, FIG. 5, between the upper row 40 of feeder tubes and the row 42 of feeder tubes closest to the downcomer end 44. In series this way, the outermost or peripheral series of compartments 34 feeds the uppermost row of feeder tubes 40, and the inner series of compartments 36 feeds the row of feeder tubes 42 closest to the downcomer end 44.

Although this arrangement feeds a larger number of feeder tubes, sixteen in number, the tubes of necessity are closer together and the wall thickness of the downcomer end must be increased over that shown in the embodiment of FIGS. 1–3.

FIG. 6 shows the comparison of performance of the downcomer with and without the grid plates installed, for various percentages of steam in a water and steam mixture. It is apparent that the deviation in water flow from average is substantially nil throughout the range of proportions for the steam and water mixture when the grid plates are installed, as compared to substantial deviations, particularly as the steam content increases, when no grid plates are used.

Although the invention has been described with respect to two embodiments, additional advantages and variations within the scope and spirit of the invention as defined in the following claims will be apparent to those skilled in the art.

What is claimed is:

1. A once-through boiler downcomer system for distribution of a two-phase fluid comprising
    an elongated downcomer of uniform inside diameter throughout its length, the downcomer incuding a closed end;
    a plurality of feeder tubes extending radially from the downcomer in the vicinity of said closed end, the feeder tubes being distributed uniformly around the periphery of the downcomer in at least two transverse planes at different distances from the downcomer closed end transverse to the downcomer;
    a plurality of flat plates disposed lengthwise in the downcomer intersecting axially in the downcomer with the flat sides of the plate extending radially from the downcomer axis;
    the plates extending in the downcomer from a point upstream of the feeder tube furthermost removed from the downcomer end to the downcomer end and dividing the downcomer into a plurality of compartments equal in number to the number of feeder tubes, one compartment serving one feeder tube.

2. A once-through boiler downcomer system according to claim 1 wherein the feeder tubes in said transverse planes are offset with peripherally adjacent tubes being in different longitudinal planes parallel to the downcomer axis, the plates intersecting the downcomer wall intermediate a tube of one transverse plane and the tube of another, the plates dividing the interior of the downcomer into a plurality of pie-shaped segmental areas;
    whereby adjacent segmental areas are in fluid communication with feeder tubes of different rows of tubes.

3. A downcomer system according to claim 2 wherein said feeder tubes are eight in number equally distributed in offset relationship around the periphery of the downcomer.

4. A downcomer system according to claim 1 including a radial array of connected plates disposed longitudinally within the downcomer, and an intersecting cordal array of plates longitudinally extending in the downcomer dividing the downcomer into inner and outer rows of flow compartments of essentially equal areas;
    means sealing the outer areas from the inner areas; and
    the feeder tubes being in upper and lower rows with the upper row in fluid communication with the outer series of compartments and the lower row in fluid communication with the inner series of compartments.

5. A downcomer system according to claim 1 wherein said plates are arranged to define a series of equally sized compartments, normal flow in the downcomer being at least 30% steam in a steam and water mixture.

References Cited

UNITED STATES PATENTS

| 3,125,995 | 3/1964 | Koch | 122—406 |
| 3,185,136 | 5/1965 | Cozza | 122—406 |

FOREIGN PATENTS

| 452,122 | 11/1927 | Germany. |

CHARLES J. MYHRE, *Primary Examiner.*